United States Patent
Fort

[15] 3,679,925
[45] July 25, 1972

[54] ELECTRICAL APPARATUS WITH CORONA SUPPRESSION MEANS

[72] Inventor: Emil M. Fort, Murrysville, Pa.
[73] Assignee: Westinghouse Electric Corporation, Pittsburgh, Pa.
[22] Filed: Feb. 2, 1971
[21] Appl. No.: 111,811

[52] U.S. Cl. .................................... 310/196, 310/45
[51] Int. Cl. .......................................... H02k 15/12
[58] Field of Search ........................... 310/196, 45, 260

[56] References Cited

UNITED STATES PATENTS

| | | | |
|---|---|---|---|
| 2,427,749 | 9/1947 | Schulman | 310/196 |
| 3,474,527 | 10/1969 | Meyer | 310/45 X |

FOREIGN PATENTS OR APPLICATIONS

| | | | |
|---|---|---|---|
| 672,690 | 9/1929 | France | 310/196 |

Primary Examiner—D. X. Sliney
Attorney—A. T. Stratton

[57] ABSTRACT

In electrical apparatus in which high voltages may occur between two closely spaced conductive members, at least one of which is insulated by a coating of insulation, and in which the electric field gradient parallel to the surface of this insulated conductor in some area is sufficient to cause surface corona, an additional member of electrical insulation is introduced to this area to form a new insulation surface with a lower field gradient, thus suppressing surface corona. To suppress end corona between the end portion of a stator coil and the stator core of a dynamoelectric machine, a collar encircling the coil at the face of the core is provided in accordance with this invention. The invention facilitates the production of high voltage machines in which the coils are insulated by post impregnation (i.e., after winding on the core).

6 Claims, 3 Drawing Figures

INVENTOR
Emil M. Fort

3,679,925

ELECTRICAL APPARATUS WITH CORONA SUPPRESSION MEANS

BACKGROUND OF THE INVENTION

1. Field of the Invention

The invention relates to electrical apparatus with high voltages between closely adjacent parts and particularly to high voltage coils for dynamoelectric machines constructed to avoid occurrence of corona during use thereof.

2. Prior Art

Corona is a type of gaseous electrical discharge occurring when the electrostatic potential gradient along the surface of electrical insulation in air or another gaseous medium exceeds a certain value. Corona results in lost power in the apparatus and can deteriorate insulation to the point of failure. High voltage dynamoelectric machines, such as those in which the windings on the stator are at potentials of the order of 10,000 volts or more, in relation to the grounded stator core, are recognized to be quite susceptible to corona and extra care in the design of the machine is required for its avoidance.

With respect to the stator coils in high voltage machines, surface corona can occur in three particular locations. The radial electric field gradient between the coil conductor and the stator core can cause slot corona in any air gap occurring between the coil surface and the surface of the core slot. Corona can also occur at the edges of vent gaps provided in the stator core, such corona being due to local axial field gradients. A third type of corona is end corona occurring where the coil leaves the core slot and is caused by the considerable axial electric field gradient at the coil surfaces in this location.

For high voltage stators whose coils are wound from fully insulated conductors, methods to suppress corona are now well known. The slot corona and the vent gap corona can be suppressed with a relatively low resistance, semiconductor coating or finishing tape on the coils. The end corona can be suppressed with either a high resistance semiconductor coating on the end portions of the coil or with a capacitor grading system. Manni U.S. Pat. No. 2,939,976, June 7, 1960, may be referred to for some of the background concerning corona suppression in machines in which the coils are wound from insulated conductors.

There is increasing interest in providing the insulation in high voltage machines by a process sometimes referred to as post-impregnation. By "post-impregnation" is meant the application of an insulating medium, by vacuum impregnation, to conductors that have previously been wound into coils on the stator core. In post-impregnation processes the same types of insulation may be used as in the case of conductors impregnated before being placed on the stator core. For example, the individual conductive strands may be insulated by means such as glass servings or enamel. A "conductor", usually comprising a plurality of such strands, is wrapped over its length with insulating tape, typically including one or more layers of mica tape followed by one or more layers of additional tape, such as a glass tape, to mechanically secure the mica tape. Normal vacuum impregnation is performed on a length of such a conductor (e.g. by immersing the conductor in a suitable resin, evacuating the enclosure, and curing) after which it is placed in the stator core slot to form a coil. Post-impregnation is similarly performed except that the conductor, wrapped with tape as before, is wound on the stator core before the impregnation process. This provides uniform insulation over the entire wound core in one operation, prevents air gaps within the slots and avoids the need to make connections between "one-impregnated" coil segments.

Unfortunately, prior techniques for corona suppression are not readily applicable to stators that are manufactured by post-impregnation. Slot corona is not a problem in such machines as the impregnation should not leave any air gap between the coils and the slot surface. Also, a semiconducting finishing tape with a suitable conductivity could be applied after impregnation to suppress vent gap corona. The impregnation of a previously wound stator, however, makes difficult the use of a continuous surface coating, either before or after impregnation, as is commonly used on fully insulated (pre-impregnated) coils. Thus, a solution for the suppression of end corona in such machines has not previously been available. A sufficiently high resistance, permeable tape that could be applied before impregnation is difficult to obtain and the use of capacitive grading is not very practical for voltages below about 18,000 volts which can still be sufficiently high to cause corona.

SUMMARY OF THE INVENTION

The present invention is primarily directed to means for the suppression of end corona in those instances, such as in the case of post-impregnated stator coils, where prior means have been ineffective. In accordance with this invention, a collar of electrically insulating material is disposed to completely encircle the conductor in a manner that is in contact with both the conductor and any previously applied insulating coating thereon and the adjacent conductive bodies such as the stator core so as to decrease the maximum electric field gradient on the surface of the insulation separating those two conductive members.

The invention can be readily applied in machines in which the coils are insulated by post-impregnation. A way in which this can be done is to apply an encircling collar around the wound coil in essentially the desired position with a subsequent impregnation process causing any voids to be filled between the collar and the adjacent conductors and also to cause the collar to adhere firmly thereto. Alternatively, the corona suppression collar can be affixed after impregnation of the coil with the desired function achieved so long as care is taken to avoid any air gap between the collar and adjacent surfaces.

THE DRAWING

DESCRIPTION OF THE PREFERRED EMBODIMENTS

Figure 1:
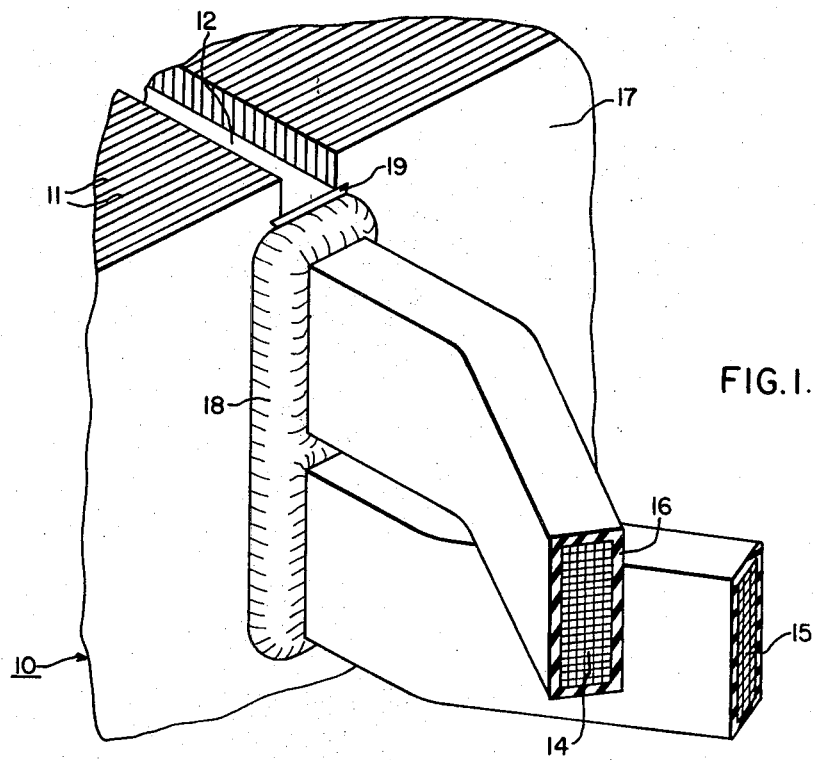
FIG. 1 is a partial view, in perspective, of electrical apparatus in accordance with the present invention.
Figure 2:
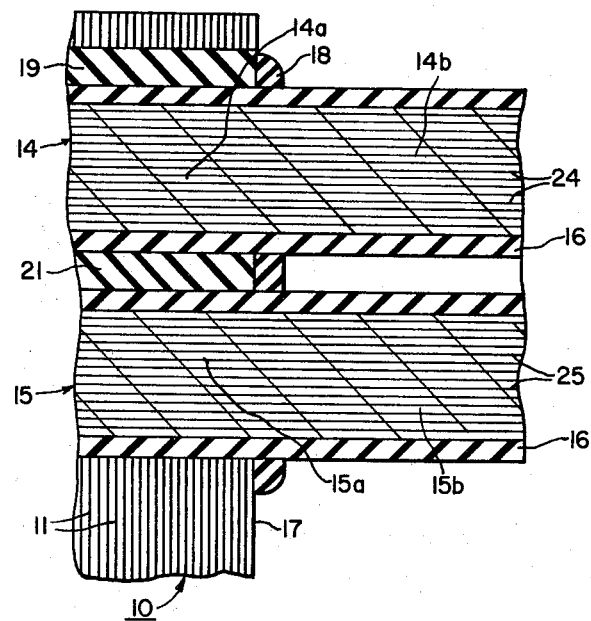
FIG. 2 is a cross-sectional view of a portion of the structure shown in FIG. 1.

Referring to FIGS. 1 and 2, there is shown a portion of electrical apparatus, such as part of the stator of a dynamoelectric machine. The stator includes a magnetic core 10 that comprises a plurality of stacked laminations 11. In the portion of the structure shown, the magnetic core 10 is provided with a slot 12 within which are positioned upper and lower coils 14 and 15. The ends of each of the coils 14 and 15 are here sectioned to reveal the internal structure. A coating 16 of insulating material 16 surrounds the individual coils 14 and 15 both within and outside of the slot 12. The coils respectively comprise portions 14a and 15a within the slot 12 as well as end portions 14b and 15b extending outward from an end face 17 of the magnetic core. A conventional slot wedge 19 of insulating material may be provided to secure the coils within the core. A conventional filler strip 21 of insulating material (e.g. mica) may, also, be disposed between the two coils 14 and 15.

Reference numeral 16 identifies the insulation system provided between the coils 14 and 15 and the core 10 and also that over the end turns 14b and 15b. While sometimes referred to herein as a coating or layer 16, it is to be understood that it may consist of a plurality of elements. For example, it may have three successive portions: first, the insulation on the individual conductive strands 24 and 25; second, layers of insulating tape; and third, a quantity of cured resin.

As discussed hereinbefore, means for corona suppression have been known where the conductors are completed with their insulation system 16 before being wound or inserted in coil slot 12. Post-impregnated stators, however, are not amenable to corona suppression means as have been previously employed. Thus, completion of the insulation coating or system 16 by post-impregnation leaves a "corner" surrounding the coils 14 and 15 at which end corona is likely to occur. This corner or space would normally be occupied by the air or other gaseous medium in which the machine is disposed.

As an incidental result of post-impregnation, the insulation applied in the impregnation process will coat all exposed parts of the stator core 10 including end face 17. Such a coating on end face 17 has no appreciable effect on the likelihood of corona and is ignored in the drawing.

In accordance with this invention, the space adjacent the face 17 and coils 14 and 15 is filled by a collar 18 of insulation material that is disposed around each of the coils 14 and 15 in contact with the insulation coating 16 of the end turns 14b and 15b, and against the face 17 of the core 10. The electric field gradient on the surface of this collar will now be considerably lower than that on the initial insulation surface without the collar.

In dynamoelectric machine operation, the coils 14 and 15 may carry voltages up to substantially in excess of 10,000 volts while the stator core 11 is at ground potential. The inception voltage, which is that voltage at which end corona is initiated, is approximately proportional to $\sqrt{t/\epsilon}$, where $t$ is the thickness and $\epsilon$ is the dielectric constant of the insulation. Here that effective thickness of insulation is substantially increased.

The outer dimensions of collar 18 may be chosen in accordance with the need. In general, a collar extending a greater distance along face 17 from 12 and a greater distance along the coils 14 and 15 away from the face will be more effective. Thicknesses (in the directions just indicated) about five times that of the impregnated insulation coating 16 (which is typically about 100 mils to 200 mils, thick) would be suitable in many applications.

In accordance with this invention, the insulation materials for the impregnated coils and for the collar may be selected from various known materials. The impregnated coil insulation can be applied from a fluid in an evacuated chamber and comprise various resinous materials such as polyester, epoxy or silicone resins. The insulating collar 18 may be of a preformed solid member of similar composition or of a different composition compared to that used in the post-impregnation process. It is suitable to employ a collar of absorbent material, for instance, polyester felt, that is fixed in position before impregnation and would be saturated with the resin employed in the impregnation process.

Figure 3:
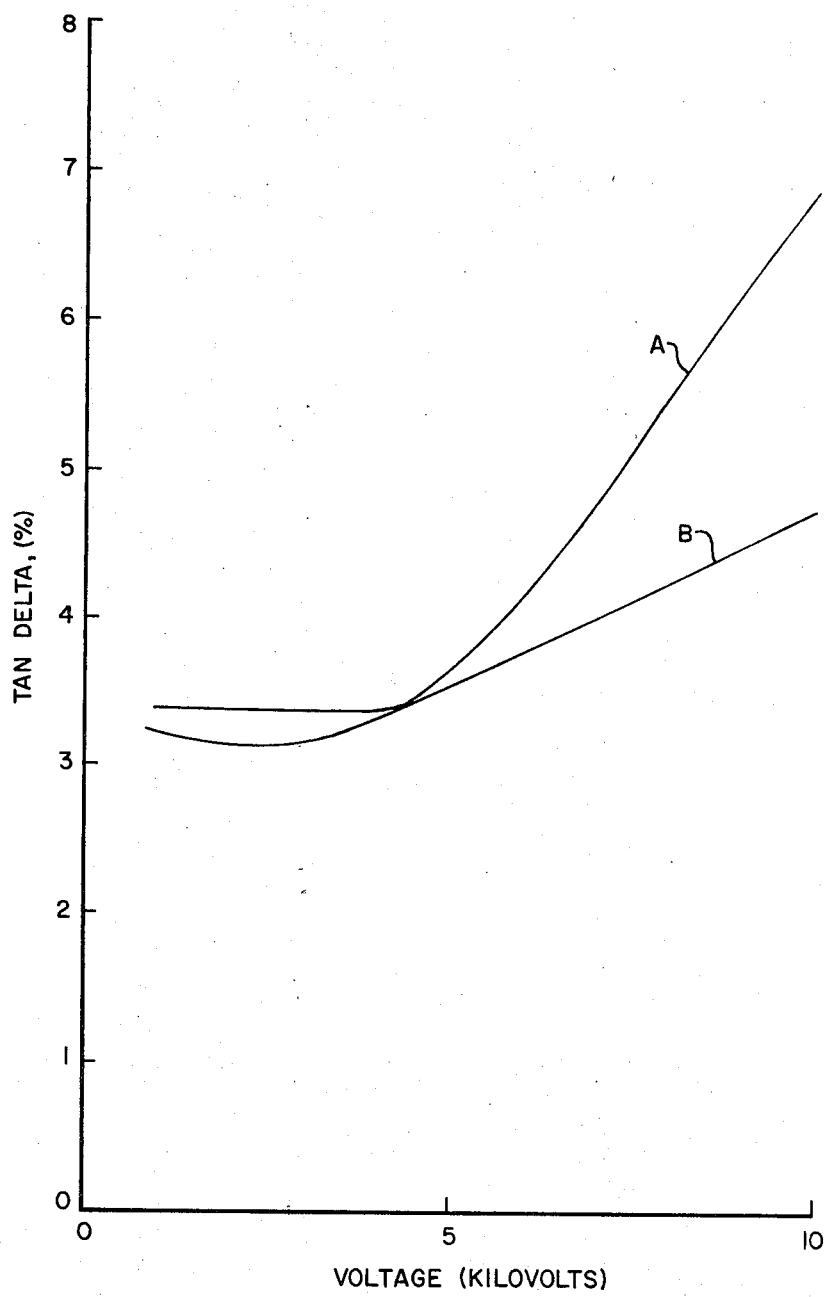
FIG. 3 is a graph illustrating curves to show the effectiveness of the present invention.

The invention has been demonstrated by constructing a model of a stator core in which two test bars were disposed in a slot and impregnated with an epoxy resin. The total amount of corona occurring both internally and at the end where the bars extended from the core was evaluated by the known method of using a Schering bridge and measuring the tangent of the phase angle δ occurring when the bridge is in balance for various values of applied voltage between the bars and the core. The results are shown in FIG. 3. Curve A illustrates the results occurring over a range of from 1000 to 10,000 volts for such a configuration without a corona suppression collar in accordance with this invention. Curve B illustrates the results with the same structure after reimpregnation of a collar of a polyester felt material around the bars. These curves show clear improvement in the structure in accordance with this invention.

While particularly advantageous in machines made using a post-impregnation process, the invention is not so limited, i.e., insulating coating 16 may be applied by other means such as full insulation applied to individual conductors before winding. In any event the collar 18 will have the effect of reducing the voltage gradient between the core 11 and coils 14 and 15.

While the invention has been primarily discussed to the problem of corona suppression in dynamoelectric machines, or the stator coils of such machines, it is to be understood that it can be applied in other electrical apparatus such as for example high voltage bushings.

What is claimed is:

1. A high voltage dynamoelectric machine comprising: a stator including a magnetic core with at least one slot extending therethrough, a coil of an electrical conductor wound around said core with a portion disposed within said slot and an end portion extending into a gaseous medium beyond an end face of said core, said coil comprising at least one conductive turn embedded in a mass of insulation by impregnation after said turns are wound on said core, a corona suppressing insulation collar around said coil and in contact with the insulation on said coil and that on said end face, said collar completely encircling said end portion of said coil and occupying a volume through which the shortest paths between said end face and said end portion of said coil occur.

2. The subject matter of claim 1 wherein: said collar is of an absorbent insulating matrix impregnated with a resinous insulating material that also comprises a component of the insulation in which said conductive turn is embedded.

3. The subject matter of claim 1 wherein: said magnetic core of said stator and said coil are operated with a voltage difference therebetween of at least 10,000 volts.

4. A method of making electrical apparatus capable of operation at high voltages with low probability of corona, comprising the steps of: assembling electrically conductive members of the apparatus to be operated at substantially different voltages; placing a continuous member of an insulating material in corners between said conductive members that otherwise would be occupied by the gaseous ambient in which the apparatus operates; impregnating the assembled conductive members with an insulation medium to provide solid insulation between said conductors and to securely bond said member of insulating material to said conductive members without a gap therebetween.

5. The subject matter of claim 4 wherein: said member of insulating material is a preformed solid member of insulating material.

6. The subject matter of claim 4 wherein: said member is of an absorbent insulating matrix.

* * * * *